May 9, 1933.   J. C. BOGLE   1,908,493
ELECTRICALLY CONTROLLED HEATING SYSTEM
Filed Nov. 30, 1926   6 Sheets-Sheet 3

Inventor
John C. Bogle

May 9, 1933.  J. C. BOGLE  1,908,493
ELECTRICALLY CONTROLLED HEATING SYSTEM
Filed Nov. 30, 1926   6 Sheets-Sheet 5

Inventor:
John C. Bogle

May 9, 1933.  J. C. BOGLE  1,908,493
ELECTRICALLY CONTROLLED HEATING SYSTEM
Filed Nov. 30, 1926   6 Sheets-Sheet 6

Inventor
John C. Bogle

Patented May 9, 1933

1,908,493

UNITED STATES PATENT OFFICE

JOHN C. BOGLE, OF RIVER FOREST, ILLINOIS, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

ELECTRICALLY CONTROLLED HEATING SYSTEM

Application filed November 30, 1926. Serial No. 151,704.

This invention relates to a heating system, and has special reference to a heating system in which a safety apparatus is embodied.

More particularly this invention relates to an electrically controlled heating system wherein, for the purpose of heating the boiler or furnace, a burner is employed which is supplied with fuel through a conduit to be opened and closed at will through automatic means, such as a pump operated by an electric motor, or such as valves operated by electromagnets, or otherwise.

Automatic heating systems are equipped with controls responsive to variations of temperature in the room or other enclosure which is to be heated. For example, such a control may comprise a wall thermostat capable of directing the generation of heat in order that there will be a balance between supply and demand at any and all times without excessive variations in the room temperature. Controls such as these will hereinafter be designated "primary controls."

Other forms of controls for automatic heating systems are those directing the specific limits of temperature or pressure to be obtained by the boiler or furnace. These instruments may include a water thermostat on a hot water heating boiler, a pressure switch on a steam or vapor boiler, or an air thermostat upon a warm air furnace, all of which will hereinafter be designated "secondary controls."

Under normal or ordinary conditions in the heating system the secondary controls exert no controlling influence upon the operation of the system, such influence being exerted by the primary controls alone. Upon the occurrence of abnormal or unusual conditions, however, the secondary controls may dominate the action of the primary controls. From this explanation the sense in which the terms "primary controls" and "secondary controls" are used in the further description of the invention herein will be readily understood. The same terms are used in the same sense in the claims appearing hereinafter and said claims are to be interpreted in view of the above explanation with respect to said terms.

Other forms of controls used in automatic heating systems are those involved in the promoting of certain events in a predetermined sequence, as for example, starting the motor, opening the fuel valve, and applying ignition means simultaneously, to be followed after a definite interval by the cessation of the ignition means, the termination of which will not affect the operation of the motor or fuel valve. These forms just recited will hereinafter be designated "sequence controls."

Still other forms of controls are those which will hereinafter be referred to as "safety controls." In the event of failure of those controls previously recited to promote or sustain desirable conditions of combustion within the boiler or furnace when actuated upon by the primary and secondary controls working in collaboration, the safety controls shut down all electrical devices operating to permit fuel to flow or to urge combustion. The assembly of the latter electrical devices operating to permit fuel to flow and to urge combustion will hereinafter be referred to as the "burner."

The present invention includes an assembly of primary, secondary, safety and sequence controls, the sequence control being obtained by the actuation of one of the safety control means. The member so actuating the sequence control is a switch responsive to the heat in the heating system, and will hereinafter be called the "stack switch" which switch controls a second member of the safety control system known as an inverse-time-element circuit breaker. The circuit breaker is, in turn, actuated by a resistance heater in series with the electrically operated devices of the burner. The aforesaid circuit breaker will be hereinafter termed a "timed switch." As may be apparent from the foregoing description, the timed switch is actuated to shut down the system in the event of any irregularities therein as evidenced by inordinate flame conditions revealed by the stack switch. Being in series with the electrical devices of the burner, failure of the heating element by open-circuiting will cause the de-energization of said devices, which will cause the burner to cease functioning.

A further purpose of this invention is to insure that the burner shall be capable of operating only in the event that the various sequences can begin at their proper starting points and continue their normal operation; in other words, should one of the electrical devices be left in such a position after the operation of the heating system has been terminated, that would produce an irregularity in the heating system, the burner will not be capable of automatically starting. The apparatus for attaining this end is a lock-up relay and will be hereinafter referred to as the "lock switch." The particular function of the lock switch may be considered, therefore, to be that of insuring that the stack switch not only is in circuit but is capable of negotiating all its movements when properly urged.

Summarizing, the purposes of this invention are to provide a system wherein sequence control is one of the results obtained by the safety control mechanism, the latter being so designed and so arranged in the system that it also functions in the event of failure of one of the various parts to function properly, it acting either to prevent the starting or the continuance of the burner operation.

Other objects and advantages will be apparent from the description and drawings forming a part of this specification to which latter reference may now be had for a more complete understanding of the characteristic features of this invention, in which drawings:

Fig. 3—A is a wiring diagram similar to Fig. 3 showing a different form of control switch;

Figure 1:
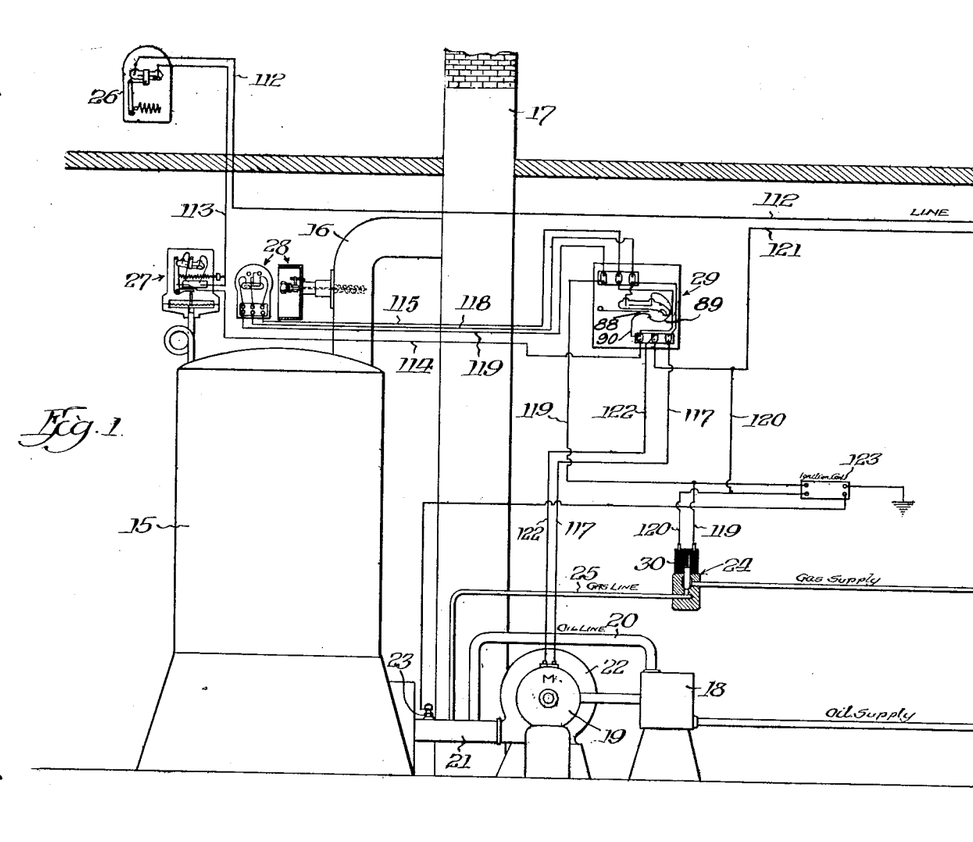
Figure 1 is a diagrammatic view of a heating system embodying one form of this invention.

Referring to the drawings, and more particularly to Fig. 1 thereof, a heating system is shown comprising a boiler 15 of any preferred construction of the usual variety, having a flue or stack 16 for connection with a chimney 17. It will be understood that while the boiler shown in the drawings, and hereinafter described in the specification, is of the steam heating type, a hot water boiler or a hot air furnace may be used in lieu thereof in the system. Also, the particular fuel burning system, which will be hereinafter described, is incorporated in the heating system merely for a better understanding of the device, and it is to be noted that any system may be applicable wherein the burner is supplied with fuel through a conduit which serves to deliver or ceases to deliver fuel through automatic means.

The boiler 15 is heated by means of an oil burner supplied with oil by an oil pump 18 operated by an electric motor 19. The oil from the pump 18 is forced through the pipe 20 to a spray nozzle (not shown) or any other pressure-building means located within the combustion flue 21. One end of the combustion flue 21 extends within the fire pot of the boiler 15, as is well known in the art, while its outer end is connected to the outlet opening of a blower 22, the fan of which is operated by the motor 19. A pilot light is utilized to cause the combustion of the oil, said pilot being ignited in turn by a spark plug 23. Gas or other combustible substance is conducted from a source of supply to a magnetically controlled valve 24 and thence through a pipe 25 to the pilot which is disposed in a suitable position adjacent the spark plug and the spray nozzle, as is well known in practice.

In the operation of the oil burner, the valve 24 admits a supply of a combustible substance to the pilot to be ignited by the spark plug 23. When the circuit through the motor is closed, the motor operates the pump 18 to force oil through the spray nozzle, said motor also operating the blower 22 to supply air to the oil for the purpose of combustion.

As the oil burner system just described may be controlled effectively by the arrangement of the electrical devices represented in any one of the electrical circuits which will hereinafter be described, a better understanding of these electrical devices may now be had, referring first to the elements in one of the circuits and their operation in that circuit, whereafter the other circuits and the elements therein will be fully described. It must be understood that the hereinafter described electrical circuits may be substituted one for the other and element for element, to control the previously described heating system.

Figure 3:
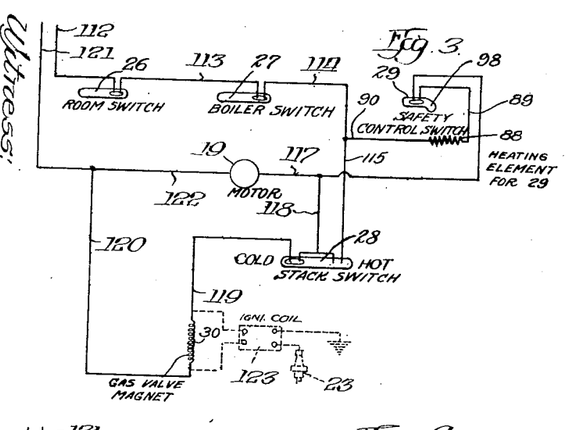
Fig. 3 is a simplified wiring diagram of the electrical circuit employed in Figs. 1 and 2.

By referring to Fig. 3 of the drawings, the devices therein represented comprise a thermostatically operated room switch 26, a pressure operated boiler switch 27, (which latter switch is used when the boiler is of the steam heating type and may be replaced by a suitable thermo-switch or hydro-switch when a boiler of another type is used) a thermostatically operated stack switch 28, a safety control switch 29, the coil 30 of the magnetic valve 24, and the motor 19. These devices will now be described in the order in which they have been placed, whereafter the electrical circuit and the operation thereof will be described in connection with the particular device in which it is located.

Figure 4:
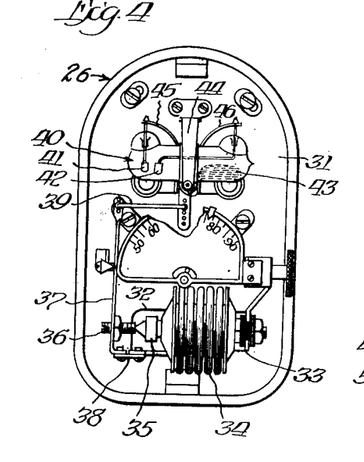
Fig. 4 is a front elevational view of a thermostatically operated room switch embodied in the heating system.

By referring to Fig. 4, the thermostatically operated room switch shown therein which has been termed the primary control, comprises a mounting base 31, of a suitable insulating material, to which base is secured a bracket 32 having a forwardly extending portion 33. A thermostatic element 34, of the expansible and contractible bellows type, is supported by, and heat insulated from, the extension 33. The other side of the bellows is furnished with a bearing 35 having a pointed end for contact with one end of a screw 36 projecting through and in threaded engagement with an actuating member or arm 37. The actuating member 37 occupies a substantially vertical position and is secured to a leaf spring member 38 at its lower end, which latter is secured to the bracket 32 thereby providing a highly resilient fulcrum for the actuating member 37. The upper end of the actuating member 37 is adjustably connected by means of a link 39 to a tiltable holder for a mercury contactor 40 suitably supported on the insulating base 31. The mercury contactor in this instance, comprises a sealed container in which cooperating electrodes 41 and 42 are sealed and in which a body of mercury 43 is disposed for the purpose of bridging the electrodes to establish an electrical circuit through the contactor. The container is tiltably mounted on a supporting bracket 44 secured to the base 31, and further, to provide a balanced support a pair of leaf spring members 45 and 46 are provided for receiving, in fixed relation, the projecting tips of the lead-in-wires for the electrodes 41 and 42 respectively. These leaf spring members eliminate flexible leads as they are in an electrical conducting relation to the electrodes and the circuit terminals to which the electrodes are thus connected. The interior of the thermostatic element 34 is provided with a highly volatile fluid which renders the bellows sensitive to the slightest temperature change. In the drawings, the contactor occupies an open position, or that indicative of the fact that the room is sufficiently warm to volatilize the fluid in the bellows to expand the latter. Should the room cool off, the change in temperature would permit the bellows to contract and to tilt the contactor to a position wherein the mercury would be caused to bridge the electrodes and close the electrical circuit therethrough. For a better understanding of the elements of this device and the operation thereof, reference may be had to a copending application Serial Number 739,006, filed September 22, 1924, and assigned to my assignee.

Figure 5:
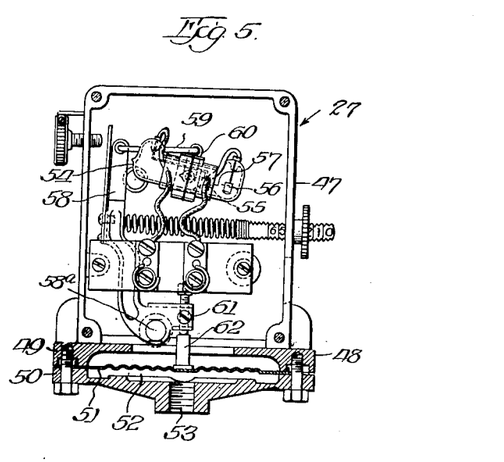
Fig. 5 is a front elevational view, partially in section of a pressure operated switch embodied in the heating system.

The pressure-operated boiler switch 27, which has been referred to as the secondary control, is shown in Fig. 5 of the drawings and comprises a casing 47 mounted on a diaphragm chamber 48 which has recesses formed in the flanged portions 49 and 50. A diaphragm 51 is extended between the flanged portions 49 and 50 and the lower recess forms a pressure chamber 52, into which chamber pressure is admitted through the opening 53. A mercury tube contactor 54 is pivotally mounted within the casing 47 and comprises the usual sealed container having spaced cooperating electrodes 55 and 56 sealed therein, and also having a body of current-conducting fluid 57, such as mercury, disposed therein for bridging the electrodes, in order that an electrical circuit may be established therethrough. The contactor is tilted in either direction by means of a vertically disposed tilting actuator 58 having a link 59 attached thereto at its upper end, which link extends to an arm 60 secured to the pivotal mounting of the contactor. The actuator 58 is pivotally mounted at its lower end to a suitable projection 58ª on the casing and has a horizontally extending portion 61 for engagement with a push rod 62 which extends upwardly from, and is secured to, the diaphragm 51. It will be apparent that any change in pressure in the pressure chamber 52 will be recorded on the diaphragm 51 which will raise or lower the push rod 62, thereby tilting the mercury contactor in a direction to make or break the electrical circuit therethrough. This operation of the device is more clearly illustrated and described in a copending application Serial No. 604,162, filed December 1, 1922, to which reference may be had for a more complete understanding of this invention.

Figure 7:
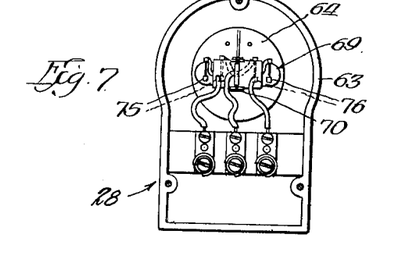
Fig. 7 is a front elevational view of a thermostatically operated stack switch for controlling the actuation of the safety switch.
Figure 8:
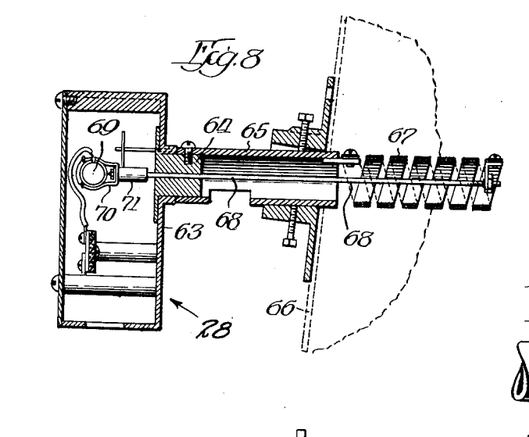
Fig. 8 is a central sectional view of the device shown in Fig. 7.
Figure 9:
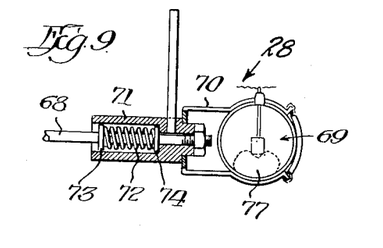
Fig. 9 is an enlarged detailed view of a portion of Fig. 8.

The thermostatically operated stack switch 28 forming one of the elements of the safety control, is illustrated in Figs. 7, 8 and 9 of the drawings and comprises a casing 63 having a bearing member 64 secured to and projecting from the rear wall, said bearing member having a tube 65 mounted thereon which projects a short distance into the stack 66 and is secured thereto in a manner to afford adjustment between the casing and the stack. A helical bimetallic element 67 is disposed adjacent the end of the tube 65 and in axial alignment therewith. One end of the helical element is secured to the tube 65 and the other end is secured to a rod 68 supported in said bearing member 64 and extending therethrough into the casing 63.

A mercury contactor 69 is supported in a clip 70 which is fixedly mounted on a collar 71. The collar, in turn, is mounted on the end of the rod 68 and is in frictional engagement therewith, a spring 72 being disposed between a collar 73 fixed to the rod and a collar 74 loosely mounted thereon, whereby said spring normally urges said loosely mounted collar into engagement with the collar 71 thus holding the latter in frictional engagement with said rod. The contactor 69 comprises a hermetically sealed container having preferably two pairs of spaced cooperating electrodes 75 and 76 sealed therein, one pair of said electrodes being disposed adjacent each end of the said container. A body of mercury 77 is also disposed in said container for bridging either of the pairs of spaced electrodes 75 or 76 in order to complete an electrical circuit therethrough.

In the operation of this device, one pair of electrodes is normally in a closed circuit position, for example, if the stack switch is in a position registered by a previous temperature decrease, indicating that subsequent to the said decrease no perceptible temperature increase has occurred—the said condition being indicative either of no combustion in the furnace or boiler or that the combustion is unduly waning and with the mercury to the left of the contactor or in "cold" position—the electrodes 75 are bridged and an electrical circuit is completed therethrough. When combustion does occur within the boiler, the helical element 67 actuates to rotate the rod 68 whereby the contactor 69 is caused to tilt and the mercury caused to move to bridge the electrodes 76 and establish an electrical circuit therethrough ("not position"), thus breaking the heretofore existing circuit through electrodes 75. This operation of the device is more clearly illustrated and described in the copending application filed December 17, 1925 and bearing Serial No. 75,895, to which reference may be had for a more detailed description of the operation of this device.

Figure 6:
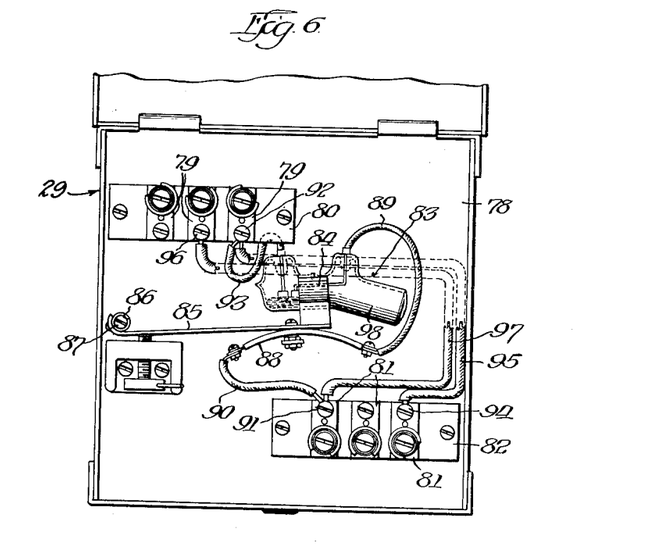
Fig. 6 is a front, elevational view of the safety control switch which is employed in one form of the invention.

The timed switch 29, which is the second element of the safety control and shown in Fig. 6 of the drawings, comprises a casing 78 having a plurality of contact plates 79 secured to an insulated terminal block 80, and a second set of contact plates 81 secured to an insulated terminal block 82. Both of said terminal blocks are suitably fastened to the casing. A mercury tube contactor switch 83 is mounted in a clip 84, which clip is secured to a bimetallic element 85 and the latter is in turn pivoted upon a post 86 fixedly mounted on the casing by a screw member 87. A heating element 88 is secured to the underneath portion of the bimetallic element 85, one end of said element being connected by wire 89 to one of the electrodes in the contactor tube 83, and the other end of said bimetallic element being connected by wire 90 to a binding post 91. A second electrode in the contactor tube 83 is connected to a binding post 92 by means of wire 93. The binding post 92 is connected to a binding post 94 by means of a wire 95, while the binding post 91 is connected to binding post 96 by means of a wire 97. In the operation of this switch, when the heating element 88 is supplied with current, the heat thus generated serves to bend the bimetallic element 85, which action tilts the mercury tube 83 and causes the mercury therein to flow in one direction and break the electric circuit existing therethrough. In adapting this switch for use as a safety means, it is desirable that provisions be made whereby the present invention may be restored to an operative position by manual means only. One method of accomplishing this purpose is to provide a well 98 on the end of the contactor tube opposite to that end in which the electrodes are disposed. In this particular instance, this well is furnished by a depression extending below the lower level of the main portion of the tube.

When the mercury has been disposed in this well, it will necessarily remain therein because, upon the cooling of the heating element 88, subsequent to the deenergization thereof, the bimetallic 85 is likewise cooled and returns to a normal position. However, the normal position of the bimetallic element is not such as will cause a sufficient tilt of the contactor 83 to cause the mercury to flow from said well 98. The mercury may then only be restored by manually lifting the tube to a position where the mercury will flow back to the opposite end of the tube to bridge the contacts, whereafter the normal positioning of the tube will cause the mercury to remain in a closed circuit position. This device is more particularly described in an application filed December 2, 1926, Serial No. 152,123, to which reference may be had.

Figure 10:
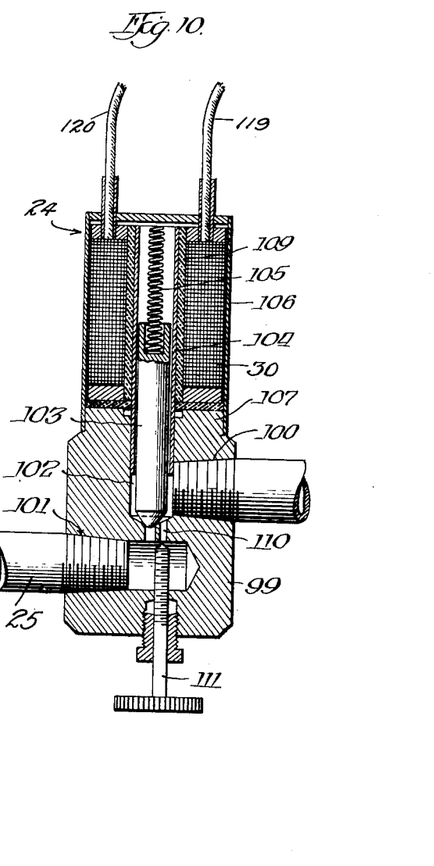
Fig. 10 is a central sectional view of a magnetically operated valve employed in the present system in connection with the ignition means.

The electromagnetically operated valve 24, which is a member of the sequence control, comprises a base member 99, which is integrally formed from a block of metal and drilled to provide inlet and outlet ports and valve chambers. The inlet port 100 is formed in one side of the base 99, while the outlet port 101 is formed in the opposite side and below said inlet port. A main port 102 serves to connect the inlet and outlet openings, the port 102 being controlled by the movement of an iron plunger 103 which is vertically reciprocable in an upstanding tubular member 104, which latter is soldered, or otherwise secured, to the metal base 99 and rises substantially centrally therefrom, as shown.

A spring member 105 is secured between the top of the tubular portion 104 and the upper end of the plunger 103 whereby the plunger is maintained in position to close the main port when the valve is de-energized. A cap portion 106 is adapted to seat on a collar portion 107 of the base 99, and surrounds the electromagnetic coil 30 which is of an elongated hollow cylindrical construction, said coil having an inner cylindrical surface formed by a spool 109 of bakelite, or other material. In the operation of the device, the coil is energized and the electromagnetic lines thread through the plunger 103, which latter is raised against the action of the spring whereby the degree of opening of the main port opening 102, between the inlet and outlet, is controlled.

Figure 2:
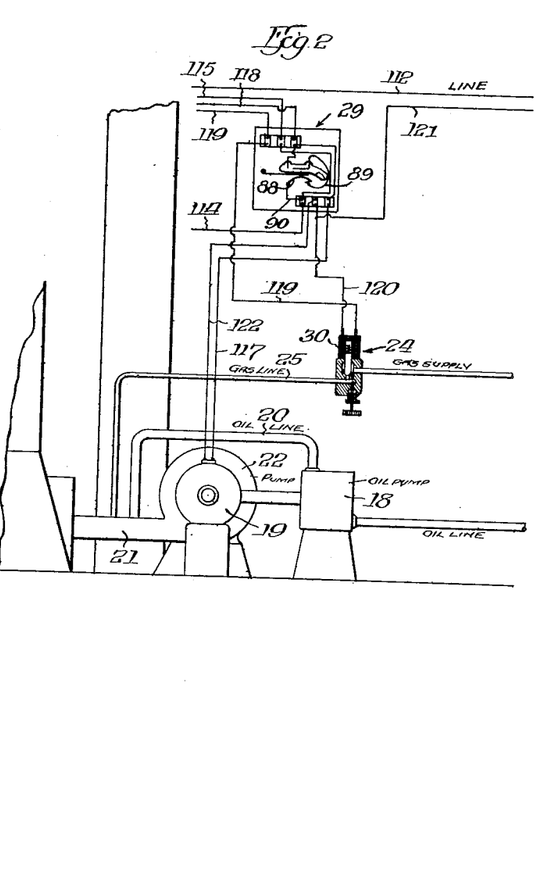
Fig. 2 is a view similar to Fig. 1, showing a portion of a heating system incorporating a slight modification of the preferred form.

However, in the construction of the valve shown in Fig. 2 of the drawings, the inlet and outlet openings are further joined through an auxiliary opening 110, which opening is controlled by a manually operated and exteriorly accessible screw member 111. By proper manipulation of this screw member 111, the auxiliary port 110 may be left in such a position that a constant flow of a combustible substance therethrough is eventuated when the main plunger 103 is in closed position. A more complete understanding of the construction and operation of this device may be obtained by reference to a copending application filed November 27, 1925, and bearing Serial No. 71,860.

It will be noted there is a difference in the structures of the valves shown in Figs. 1 and 2, in that one structure (see Figs. 2 and 10) includes the by-pass 110 around the main valve chamber, whereas the other structure (see Fig. 1) eliminates this by-pass. This is the result of the use of a spark plug, or other electrical ignition means, as against a constant supply of fuel to a pilot light which is used where the electrical ignition means are omitted.

The electrical devices just described are included in each of the wiring diagrams of Figs. 1, 2 and 3. The three electrical circuits comprised in these figures are substantially the same, the main difference being that between Figs. 1 and 2 wherein the ignition means of Fig. 1 constitutes an ignition coil 123 in lieu of the pilot light of Fig. 2.

By referring to the diagram of Fig. 3, it will be noted that one side of the line is connected to one of the electrodes of the room thermostatic switch 26 by means of the wire 112. The other electrode of switch 26 is connected to one electrode of the pressure-controlled boiler switch 27 by means of the wire 113. The other electrode of switch 27 is connected to one end of the heating element 88 for the timed switch 29 by means of wires 114 and 90 and to one of the electrodes of the stack thermostatic switch 28 by means of wires 114 and 115. The other end of the heating element 88 is connected to one electrode of the switch 29 by the wire 89, as previously stated, and the other electrode of the switch 29 is connected to the motor 19 by wire 117 and to one of the electrodes on each end of the contactor of the switch 28 by means of wire 118. The remaining electrode in the contactor of switch 28 is connected to one terminal of the coil 30 of the magnetically operated valve 24 by wire 119, while the other terminal of the coil 30 is connected by wire 120 to the other side 121 of the line. The circuit is also completed through the motor by means of the wire 122 connecting the motor to the line 121.

By applying like reference numerals to the diagram shown in Figs. 1 and 2, the circuit connections as described in Fig. 3 may be readily apparent in these figures.

In the operation of the heating system, the thermostatic or primary control switch 26 is located in a room, the temperature of which is to be regulated, and according as the temperature is above or below a predetermined degree, the bellows 34, comprised in the switch 26, will actuate to tilt the contactor tube to open or close the circuit therethrough. Furthermore, the pressure or secondary control switch 27 is mounted on the boiler to be operated and is controlled by the pressure in the boiler, and the stack switch 28 is mounted in the stack to be operated and controlled by the combustion obtaining within the boiler.

Assuming that it is desired to start the oil burner, the switch 26 is in a closed circuit position because the temperature in the room is below a predetermined degree; the switch 27 is in a closed circuit position because there is no excess pressure in the boiler, the switch 28 is in "cold" position with the mercury to the left because there is no combustion in the furnace, and the switch 29 is in a closed circuit position which is its normal position. With this conditioning of the circuit, the current will flow directly through the motor 19 and the resistance element 88 governing the timed switch 29 and then through the valve 30 or ignition circuit which is connected directly across the motor, the mercury of switch 28 being on the left or the switch 28 occupying "cold" position.

If a proper combustion is thus obtained, the switch 28 will eventually move to a "hot" position with the mercury to the right, will disconnect the ignition circuit and will shunt the current flow through the resistance element 88 of the timed switch 29 because a low resistance circuit, namely, the "hot" position of switch 28, will now be connected in shunt to the high resistor 88 of said timed switch 29.

When the temperature of the room reaches a predetermined degree, the bellows 34 of the switch 26 will actuate to tilt the contactor tube to open circuit position and the motor will be disconnected from the line. This, then permits the stack switch 28 to cool, moving the switch 28 back to a "cold" position with the mercury to the left.

However, should proper combustion not obtain in the boiler when the ignition circuit is closed because of the lack of oil, failure of the motor to operate, or through other interfering conditions previously mentioned, the stack switch 28 will not be heated because of the lack of combustion, and therefore, the switch 28 will remain in "cold" position. As a consequence thereof, the current supplied to the motor 19 will continue to flow through the resistance element 88 of the timed switch 29 for an undue length of time and thus cause the resistance element 88 to heat the bimetallic member 85 to tilt the contactor 29 to an open circuit position. By reason of the well 98 formed in the contactor, the mercury cannot be returned by the bimetallic element to such a position as to bridge the electrodes in the contactor, said mercury being capable of being restored only by manual operation. When this control switch 29 opens the circuit, it disconnects both the motor and ignition circuits from the line as long as the stack switch 28 occupies "cold" position.

The switch 27 opens the circuit when the steam pressure exceeds a certain predetermined amount and is operative independently of the other switches in the circuit, since it is connected in series with the room thermostatic switch 26. It is to be understood that this pressure switch is used when the installation is a steam pressure installation and that switches of slightly modified forms, but of the same general characteristics, may be used for hot water or hot air installations.

It has been stated that different means of ignition have been used in the systems shown by Figs. 1 and 2. A pilot light ignition is shown in Fig. 2, wherein the auxiliary opening 110 of the valve 24 controlled by a manually operated member 111, permits of a constant flow of gas or other combustible substance through the valve to light a pilot light which is augmented at a time when the burner is in operation by a greater flow of the combustible substance through the main port 102 of the valve 24. In the construction shown in Fig. 1, the auxiliary opening is omitted and a supply of gas is admitted through the main port 102 only when the burner is in operation, or at the initiation of the burner operation prior either to the successful ignition or to the termination of the burner operation by automatic means, the gas being lighted by a spark plug 23 operated by the ignition coil 123. The ignition coil 123 is tapped into the lines 119 and 120 and is controlled thereby.

It may be desirable to substitute for the timed switch 29, another form of timed switch which operates to control the heating system upon failure of combustion. Further, it may also be desirable to insure that the switch controlled by the heat in the heating system is in a proper condition to negotiate all of its normal functions when properly urged. For example, should the stack switch 28 become inoperative by becoming wedged, or otherwise fixed, in "hot" position with the mercury to the right, it is the further purpose of this invention to permit the system to continue its operation until normally terminated by the primary or secondary switches, whereafter the circuit having thus been opened cannot be restored to an operative position until the stack switch 28 is repaired. Such a control for the stack switch 28 will now be described, together with another form of timed switch, a description of the elements forming these devices being recited first, whereafter the same will be substituted in the electrical circuits heretofore described in Figs. 1, 2 and 3.

Figure 12:
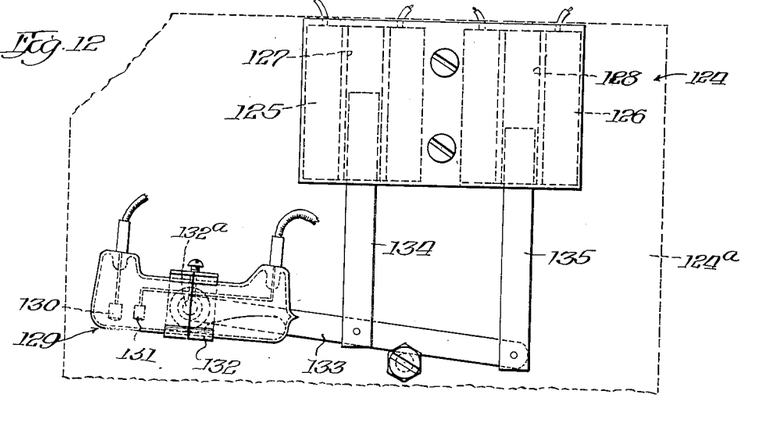
Fig. 12 is a front, elevational view of a portion of the safety control mentioned in Fig. 11.

As shown in Fig. 12, the switch 124 referred to as a lock switch comprises a plate 124ᵃ upon which is mounted a pair of solenoids or coils 125 and 126 having openings 127 and 128 respectively extending centrally therethrough. A contactor 129, comprising a sealed container having a pair of spaced cooperating electrodes 130 and 131 sealed therein and situated at one end thereof, is disposed to the left and below the solenoids 125 and 126. A body of current-conducting fluid, such as mercury, is also disposed in said container and is adapted to bridge the electrodes contained therein for the purpose of establishing an electrical circuit therethrough.

The contactor 129 is held centrally by a clip 132, which latter is pivotally mounted at 132ᵃ in a suitable manner upon the plate 124ᵃ. An arm 133 is also pivoted upon said pivotal mounting 132ᵃ and extends therefrom to be, in turn, attached by means of pivotal connections to a pair of vertically disposed plungers 134 and 135, said plungers extending through the openings 127 and 128 respectively of their respective solenoids. The coil 125 will hereinafter be termed the "pull coil" and the coil 126 will be termed the "hold coil" by nature of their characteristics, as will be hereinafter more fully described.

Figures 13, 14:
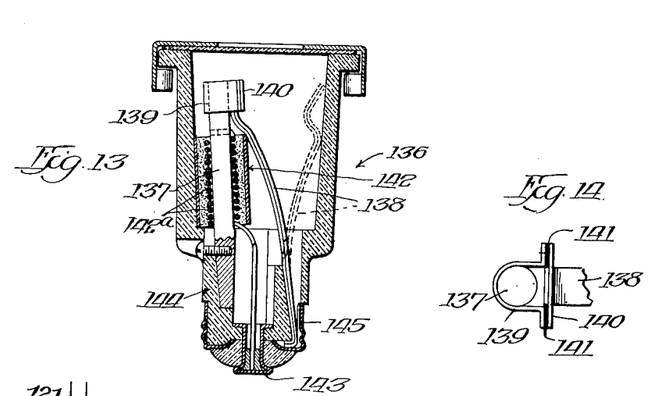
Fig. 13 is a central sectional view of a fuse used in connection with the safety control.
Fig. 14 is an enlarged detail view of the fusible member of the fuse shown in Fig. 13 as viewed from the top thereof.

The electrical cut-out or fuse 136, known herein as a timed control, is shown in Figs. 13 and 14, and comprises a relatively rigid brass contact member 137 and a resilient contact member 138, which latter member consists of a steel strip for producing a desired resiliency and a copper strip for serving as a shunt for the steel strip so that the latter may not lose its resiliency through overheating. The member 138 is fixed at one end and is normally held adjacent the member 137 in a flexed position by means of a fusible link 139 which is shown, particularly in Fig. 14, as a U-shaped member with a metal bar 140 secured across its open ends by readily fusible material 141. Under conditions of a sufficiently high current flow and through an excess period of time, the member 138 is released and its electrical connection with the member 137 is broken by the fusing of the fusible material 141.

The heat necessary for the release of the spring member 138 is developed by heating means 142 associated with the member 137, and is transmitted to the link member 139 by conduction through said member 138. The heating means comprises a resistance heater 142ᵃ coiled on the member 137 and is embedded in a cement of low thermal conductivity which, in turn, is enveloped in a paper jacket. One end of the resistance wire is secured to the member 137 and the other end is soldered in a central terminal 143 mounted in a base 144 intended for use in sockets of the Edison screw type. The spring member 138 extends through a hole in the base 144 and is soldered, welded or otherwise fastened, to a screw shell terminal 145 encircling the base 144. The base 144 is enlarged and extends upwardly to form a casing for these previously described operating parts and is enclosed at its upper end by a suitable cap. This device is more fully illustrated and described in Patent No. 1,265,576, issued May 7, 1918, to which reference may be had.

Figure 3A:
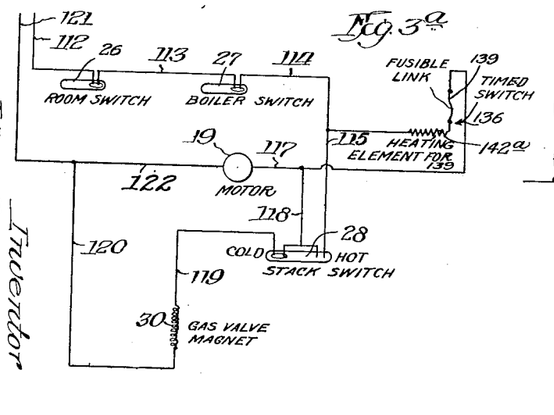
Figure 11:
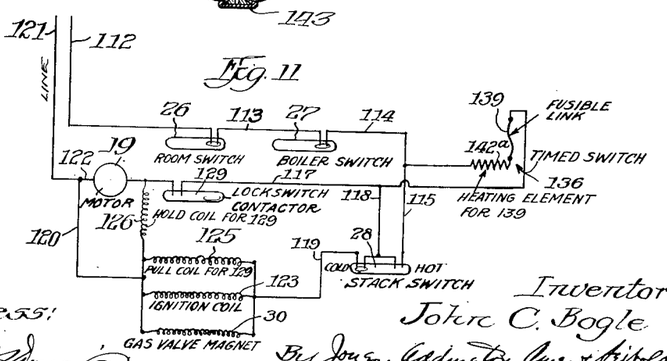
Fig. 11 is a wiring diagram of an electrical circuit, similar to that shown in Fig. 3, showing a safety control of a modified form.

By referring to Fig. 11, it will be noted that by comparing the same with the electrical circuit of Fig. 3, the electrical cut-out or fuse 136 is connected in circuit in the same position and may be used interchangeably with the timed switch 29. Under such a circumstance and for this particular purpose, the resistor 142ᵃ is the equivalent of resistor 88 of Fig. 3 and the fusible link 139 is the equivalent of the contactor of the switch 29 of Fig. 3. (In Fig. 3—A, these aforesaid equivalents, namely the resistor 142ᵃ and the fusible link 139 have been substituted respectively for the resistor 88 and the contactor switch 29 of Fig. 3.) The timed switch or cut-out 136 is connected in parallel with the stack thermostatic switch 28—both of which devices are connected in series with the primary and secondary controls as shown in Fig. 3, 3—A, or 11—in the "hot" position of the switch 28 or the operating condition of the system.

In Fig. 11, the ignition coil 123, the coil 30 of the gas valve 24 and the pull coil 125 of the lock switch 124 are all connected in parallel, and this parallel-connected group of elements is connected in series with the "cold" end of the stack switch 28 to constitute a circuit branch that is bodily connected in parallel with the branch or portion of the main circuit comprising the motor 19 and the contactor 129, which latter two elements are connected in series with each other. The hold coil 126 is connected directly in parallel with the motor 19 alone. The stack switch is in a "cold" position, with the mercury to the left, throughout the time that the burner is not in operation and as long as the ignition coil and the gas valve are in operation. The mercury switch 129 is open when the burner is not in use.

Assuming that the temperature of the room is reduced, the room thermostat 26 closes, the boiler switch 27 is closed because there is little or no pressure in the boiler, and current will then flow through the switches 26 and 27, the fuse 136, the "cold" position of the stack switch and in parallel through the coil 30 of the magnetic valve, the ignition coil 123, and the pull coil 125 and to the line. The pull coil 125 will be energized to raise the plunger 134 and thus tilt the tube 129 to closed circuit position, which action then closes the circuit through the motor.

As the motor starts, the ignition coil 123 and the coil 30 of the gas valve will be in an operative position and the burner will be ignited. If, however, the oil burner fails to ignite for any reason, the stack thermostatic switch 28 will remain in "cold" position and all the motor current will then be flowing through the cut-out 136. If this current flows for an undue length of time, the fusible member 139 of the switch 136 will be fused and consequently open the circuit therethrough, while the complete circuit will remain in disconnected relation until the spring member 138 of the fuse 136 is replaced in its normal operative position adjacent the member 137, whereafter a new fusible member 139 (Fig. 14) is slipped over the ends to maintain these members in operative position.

If the burner properly ignites, the stack thermostatic switch 28 will move to "hot" position thereby shunting out of circuit the electrical cut-out or fuse 136 by shunting around said fuse. If the stack switch moves to "hot" position, current will continue to flow through the contactor 129, which will now be in closed circuit position, but will discontinue to flow through the pull coil 125, the ignition coil 123 and the coil 30 of the valve. The hold coil 126 will be energized by reason of its being connected in parallel across the motor and will operate to hold the plunger 135 in up-position with the circuit closed through the contactor 129 as long as the current is flowing through the motor 19. Therefore, the burner will operate through the switches 26 and 27, the "hot" position of switch 28, the closed position of contactor 129, whereafter the current is divided, some current passing through the motor to the line, and the remaining current shunting around the motor to energize the hold coil 126, thereby holding the contactor 129 in closed circuit position.

When either the primary control 26 or the secondary control 27 opens the circuit, which indicates either that normal temperature is restored in the room or that the boiler pressure is excessive, the hold coil 126 will be de-energized and thereby permit the plungers 134 and 135 to drop, and in so doing tilt the contactor 129 to an open circuit position, which action disconnects the motor from circuit.

If the stack switch 28 should fail to operate and be held in "cold" position, with the mercury to the left, the cut-out 136 would open the motor circuit within a short interval of time, and the circuit would not be restored to operative position without replacing or reconditioning the cut-out 136. If, however, stack switch 28 should remain in running position, the motor 19 would continue to operate until either the switch 26 or 27 opens the circuit, and the circuit having thus been opened, it can not be restored to an operative position because the contactor 129 will not close, since no current will flow through the "pull" coil 125.

It will be apparent from the above that when the hold coil 126 is de-energized and the plungers 134 and 135 are permitted to drop, the contactor 129 is tilted to an open circuit position, and should the switch 28 become fixed in a "hot" position, and fail to return to a normal "cold" position after the burner has been shut down, the circuit could not be closed through the system until the defects of the stack switch 28 have been remedied and the switch 28 has been returned to "cold" position.

It has been previously stated that the electrical devices, comprising primary, secondary, safety and sequence controls, may be substituted, for certain purposes, one for the other, element for element, in either of the circuits described. In order that a better understanding of my complete invention may be obtained, a building-up of the various features is herewith presented, first in its simplest form, as represented in the circuits of Figs. 1, 2, 3 and 3—A so as to enable those skilled in the art to grasp readily the fundamentals and essentials of my invention; then in a form in which elements are added to insure the control of one of the control elements, as represented in the circuit of Fig. 11. Now, therefore, my invention will be described in several preferred forms in which all of the elements hereinbefore described have been incorporated.

Figure 15:
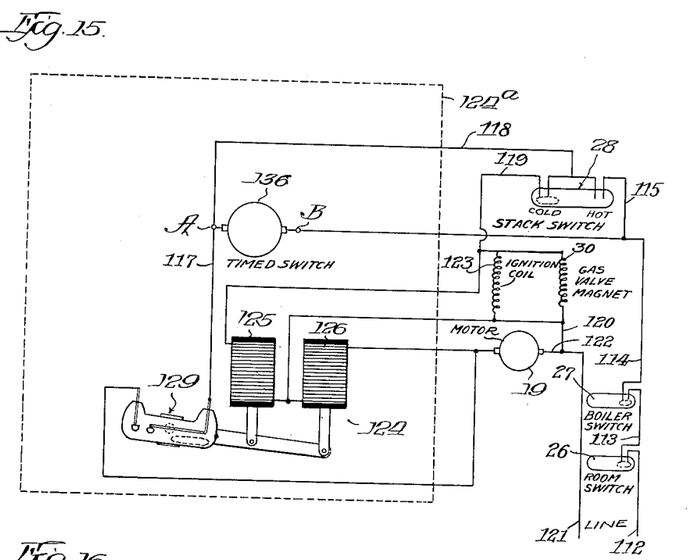
Fig. 15 is a wiring diagram of an electrical circuit, the same as shown in Fig. 11.
Figure 16:
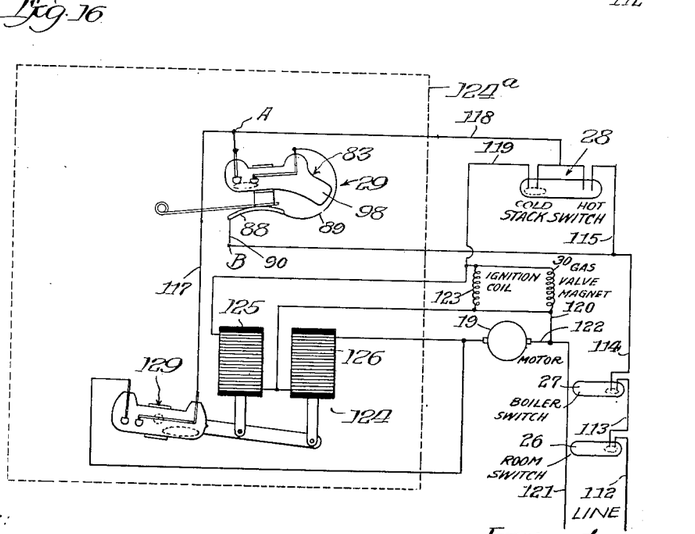
Fig. 16 is a wiring diagram of an electrical circuit embodying the preferred form of this invention, which circuit includes the elements shown in Fig. 15 with the exception of the timed switch which is similar to that shown in Figs. 1, 2 and 3.

By referring to Figs. 15 and 16, it will be noted that, with the exception of the types of timed switches employed, the circuits are identically the same. Also, the circuit shown in Fig. 15 is essentially the same as the circuit shown in Fig. 11. The control circuit, as represented in Fig. 16, which is another preferred form of my invention, insures a positive control of the heating system, the primary control actuating to cause the termination of the operation of the heating system when the temperature in the room, or other enclosure to be heated, attains a predetermined degree; the secondary control actuating to cause the termination of the operation of the heating system when a predetermined limit of temperature or pressure is obtained by the boiler or furnace; the safety controls actuating to cause the termination of the operation of the heating system in the event of failure of the previously recited controls to promote or sustain desirable conditions of combustion within the boiler or furnace; and the lockswitch, insuring that the safety controls are in an operative condition, negotiate all their movements when properly urged. In the event that the safety controls are not in a proper operating condition, the lock switch would cause an open circuiting through the heating system, so that upon a subsequent operation of the primary or secondary switches, the burner cannot be started.

In Figs. 15 and 16, it will be noted that the sequence controls, namely the coil 30 of the gas valve 24 and the ignition coil 123, are shown in the same relative positions as in Fig. 11, these coils being connected in shunt relation to the pull coil 125 of the lock switch 124.

In Fig. 16, let it be assumed that the plate 124ª is the same as that shown in Figs. 12 and 15, the solenoids or coils 125 and 126 are mounted thereon to actuate the contactor 129 in the same manner as hereinbefore described. In place of the electrical cut-out 136, the timed switch 29, as illustrated in Fig. 6, is mounted on the plate 124ª in the same manner as it is mounted in the casing 78. The points A and B are designated in both Figs. 15 and 16, and may be utilized as terminals to which either the timed switch 136 or the timed switch 29 may be connected.

The operation of the electrical devices in this circuit is the same as that of the electrical circuit shown in Fig. 11. The pull coil 125 is energized to actuate the tube 129 to a closed circuit position to cause the motor to operate. If, however, the oil burner fails to ignite for any reason, the switch 28 will remain in the "cold" position and all the motor current will be flowing through the timed switch 29 Fig. 16. If this current flows for an undue length of time, the heater element 88 will operate as hereinbefore described to tilt the tube 83 causing the mercury to flow into the well 98 and thereby break the circuit existing therethrough. The heating system will then be in an inoperative position until at such a time as the tube 83 is manually reset, and the mercury is moved back to its position to bridge the electrodes.

If the burner properly ignites, the switch 28 moves to "hot" position thereby disconnecting the timed switch 29 by shunting therearound. The current will continue to flow through the tube 129, but will be disconnected through the pull coil 125, although the hold coil 126 will be energized by reason of its being connected in parallel across the motor and will hold the tube 129 in a closed circuit position as long as current is flowing through the motor 19. When either the primary or secondary control opens the circuit, the hold coil 126 is de-energized and permits the contactor 129 to open the circuit and disconnect the motor 19 from circuit.

However, should the stack switch 28 become inoperative and remain in "hot" position, the operation of the heating system would continue to complete its cycle of operation, whereafter the system will remain inoperative until the stack switch is re-conditioned as hereinbefore described. Thus the circuit is controlled in either the "hot" or "cold" position of the stack switch 28 as the timed switch 29 will control the circuit through the "cold" position, while the lock switch will control the circuit through the "hot" position.

While several embodiments of my invention have been described, it is obvious that many modifications thereof may occur to those skilled in the art without departing from the spirit and scope of this invention, and therefore, it is desired that the latter be limited only by the scope of the appended claims and the prior art.

I claim:

1. The combination with a burner for an automatic heating system, of an electrical control circuit including a main control, a timed switch in series with said main control, a switch responsive to heat in said heating system for controlling the actuation of said timed switch, and sequence controls for the promotion of desirable conditions of combustion in a predetermined sequence, one of said sequence controls comprising a switch actuated by a pair of electromagnets controlled by said heat responsive switch, one of said electromagnets operating to actuate said electromagnetically controlled switch into a closed circuit position and the other of said electromagnets operating to hold said electromagnetically controlled switch in a closed circuit position, the arrangement being such that, upon the failure of said heat responsive switch to function properly, said heating system is prevented from starting or continuing in operation.

2. The combination with a burner for an automatic heating system, of an electrical control circuit including a main control, a timed switch in series with said main control, sequence controls for the promotion of desirable conditions of combustion in a predetermined sequence, a double switch responsive to heat in said heating system for controlling the actuation of said timed switch and said sequence controls, one of said sequence controls comprising a switch actuated by a pair of electromagnets, one of said electromagnets operating to actuate said switch into a closed circuit position upon the completion of the circuit through one side of said double switch, the other of said electromagnets operating to hold said switch in a closed circuit position upon the closing of said switch, said electromagnets cooperating to the end that upon the failure of said heat responsive switch to function properly, all other conditions and elements being normal and said heating system being in operation, said operation will be permitted to continue its cycle until normally terminated whereafter the system will be prevented from starting.

3. In an automatic heating system, the combination with a fuel supply and ignition means therefor, of an electrical control circuit including a main control, a switch biased to open for effecting the operation of said fuel supply, an electromagnet for controlling the initial actuation of said supply switch, an electrical device for controlling the operation of said ignition means, a switch responsive to heat generated in said system for placing said ignition controlling device and said electromagnet in an operative condition during the initial operation of said system and for cutting-out said ignition controlling device, and said electromagnet after said system is in operation and only in direct response to the establishment of combustion in the system, a second electromagnet operative when energized to hold supply switch closed to maintain said system in an operative condition, and a timed switch responsive to electrical current in said electrical control circuit for rendering said system inoperative upon the failure of combustion.

4. In an automatic heating system, the combination with a fuel supply and ignition means therefor, of an electrical control circuit including a main control, a switch biased to open for effecting the operation of said fuel supply, an electromagnet for controlling the initial actuation of said supply switch, an electrical device for controlling the operation of said ignition means, a switch responsive to heat generated in said system for placing said ignition controlling device and said electromagnet in an operative condition during the initial operation of said system and for cutting-out said ignition controlling device and said electromagnet after said system is in operation and only in direct response to the establishment of combustion in the system, a second electromagnet operative when energized to hold said supply switch closed to maintain said system in an operative condition, and a safety switch controlled by said heat responsive switch and responsive to electrical current in said electrical control circuit for rendering said system inoperative upon the failure of combustion.

5. In an automatic heating system, the combination with a fuel supply and ignition means therefor, of an electrical control circuit including a main control, means for controlling said fuel supply, means in a parallel circuit with and for controlling the initial operation of said fuel supply controlling means, means in a parallel circuit with said latter means and for controlling the supply of a combustible substance to said ignition means, means in a parallel circuit with said combustible substance supply controlling means for controlling the ignition of said combustible substance through said ignition means, means for maintaining said fuel supply controlling means in a closed circuit position after said heating system is in an operative condition, and means responsive to heat generated in said heating system for initially establishing an electrical circuit through said means for controlling the initial operation of said fuel supply controlling means, said combustible substance supply controlling means and said ignition controlling means to establish said heating system in an operative condition and for interrupting said last mentioned electrical circuit and establishing an electrical circuit through said means for maintaining said fuel supply controlling means in a closed circuit position when combustion is established.

6. The combination with a burner, of means for operating the burner, electrical mechanism including a circuit controlling the actuation of said means, a switch controlling said circuit, a second switch controlling said circuit, a second circuit, a third switch controlling said second circuit, means controlled by the heat produced by the burner for controlling said third switch, a fourth switch controlling said first circuit, an electro-magnet having separate windings and controlling said first-named switch, one of said windings, after the magnet is energized, serving to hold said first-named switch in the position to which it was actuated by said magnet, said third switch controlling such portion of the winding of said magnet as is required to be energized to energize the magnet to switch-actuating position, and means controlled by said third switch for controlling said second switch operating after the lapse of a predetermined length of time to condition said second switch for discontinuing the operation of said first-named means.

7. The combination with a burner, of means for operating the burner, electrical mechanism including a circuit controlling the actuation of said means, a switch controlling said circuit, a second switch controlling said circuit, a second circuit, a third switch controlling said second circuit, means controlled by the heat produced by the burner for controlling said third switch, a fourth switch controlling said first circuit, an electro-magnet having separate windings and controlling said first-named switch, one of said windings, after the magnet is energized, serving to hold said first-named switch in the position to which it was actuated by said magnet and controlled by said first-named switch, said third switch controlling such portion of the winding of said magnet as is required to be energized to energize the magnet to switch-actuating position, and means controlled by said third switch for controlling said second switch operating after the lapse of a predetermined length of time to condition said second switch for discontinuing the operation of said first-named means.

8. A device of the class described including ignition and fuel supply means and circuits therefor, a relay controlling the fuel supply circuit, a warp switch having a heating coil and a shunt circuit for the coil, the coil of the warp switch being in series with the coil of the relay, a switch for the shunt circuit, and means for causing operating of the switch as result of ignition of fuel delivered by fuel supply means.

9. A device of the class described including ignition and fuel supply means and circuits therefor, an electromagnetic device controlling the fuel supply circuit, a thermally operable device having a heating coil and a shunt circuit for the coil, the coil of the latter device being in series with the coil of the electromagnetic device, a switch for the shunt circuit and means for controlling its operation as the result of ignition of fuel delivered by the fuel supply means.

10. An electric fuel supply system comprising a relay controlling a fuel supply circuit, a warp switch having a heating coil, and a shunt circuit for the coil, the coil of the warp switch being in series with the coil of the relay and said warp switch controlling energization of the relay, a switch for the shunt circuit, and means for causing the operation of the switch as the result of the ignition of fuel delivered by the fuel supply means.

11. A device of the class described including ignition and fuel supply means and circuits therefor, a relay controlling the fuel supply circuit, a warp switch having a heating coil and a shunt circuit for the coil, said switch being in circuit with said relay, electrical connections for energizing the heating and relay coils simultaneously, a switch for the shunt circuit, and means for causing operation of the switch as result of ignition of fuel delivered by fuel supply means.

12. A device of the class described including ignition and fuel supply means and circuits therefor, a relay controlling the fuel supply circuit, a warp switch having a heating coil and a shunt circuit for the coil, the coil of the warp being electrically connected with the coil of the relay, a switch for the shunt circuit and means for causing operation of the switch as result of ignition of fuel delivered by fuel supply means.

13. A device of the class described including ignition and fuel supply means and circuits therefor, a relay controlling the fuel supply circuit and comprising a magnet coil, means for effecting energization of said magnet coil to initiate operation of the system, a warp switch having a heating coil separate from said magnet coil and connected in series circuit therewith to be traversed by the energizing current for said magnet coil whenever the latter is energized, a switch connected in circuit with said heating coil, and means for causing operation of said switch to deenergize said heating coil as a result of ignition of fuel delivered by said fuel supply means.

14. In a fuel burner control system, in combination, a source of electrical supply, electrically operated means for supplying fuel to the burner, a switch in circuit between said electrically operated means and said source, relay means comprising a magnet winding controlling the operation of said switch, means for effecting energization of said magnet winding to initiate operation of the system, means for establishing combustion at the burner upon supply of fuel thereto, and thermo-electric means for stopping operation of said electrically operated means upon failure of combustion, comprising an electric heating element separate from said magnet winding and connected in series circuit therewith to be traversed by the energizing current for said magnet winding whenever the latter is energized.

15. In a fuel burner control system, a source of electrical supply, electrically operated means for supplying fuel to the burner, means for establishing combustion of the fuel supplied to the burner, a switch in circuit between said electrically operated means and said source, electrical means energized and deenergized concurrently with said electrically operated means for holding said switch closed but incapable of actuating it to closed position, means governed in accordance with combustion of the fuel supplied to the burner for actuating said switch from open to closed position, and means operative upon failure of combustion to be established for effecting opening of said switch.

16. In a fuel burner control system, a source of electrical supply, electrically operated means for supplying fuel to the burner, means for establishing combustion of the fuel supplied to the burner, a switch in circuit between said electrically operated means and said source, electrical means comprising a relay coil energized and deenergized concurrently with said electrically operated means for holding said switch closed but incapable of actuating it to closed position, means governed in accordance with combustion of the fuel supplied to the burner for actuating said switch from open to closed position, and means operative upon failure of combustion to be established for effecting opening of said switch.

17. In a fuel burner control system, in combination, a source of electrical supply, electrically operated means for supplying fuel to the burner, means for establishing combustion of the fuel supplied to the burner, a switch in circuit between said electrically operated means and said source, electrical means comprising a relay coil energized and deenergized concurrently with said electrically operated means for holding said switch closed but incapable of actuating it to closed position, means comprising another relay coil governed in accordance with combustion of the fuel supplied to the burner for actuating said switch from open to closed position, and means operative upon failure of combustion to be established for effecting opening of said switch.

18. In a fuel burner control system, in combination, a source of electrical supply, electrically operated means for supplying fuel to the burner, a switch in circuit between said electrically operated means and said source, electromagnetic means for controlling the operation of said switch, a main control for effecting energization of a portion of said electromagnetic means to actuate said switch from open to closed position, safety control means operative upon failure of combustion to be established within a predetermined interval of time to stop the operation of said electrically operated means, and comprising an electrically energizable element separate from said electromagnetic means and connected in series with said portion thereof to be traversed by the energizing current for said portion whenever the latter is energized, and means responsive to the existence of combustion at the burner for rendering said safety control means inoperative and for controlling said electromagnetic means to cause the same positively to maintain said switch in closed position but to render the same incapable of actuating said switch from open to closed position until a substantial time after cessation of combustion.

19. In a fuel burner control system, in combination, a source of electrical supply, electrically operated means for supplying fuel to the burner, a switch in circuit between said electrically operated means and said source, electromagnetic means for controlling the operation of said switch, a main control for effecting energization of a portion of said electromagnetic means to actuate said switch from open to closed position, thermo-electric means for stopping operation of said electrically operated means upon failure of combustion and comprising an electric heating element separate from said electromagnetic means and connected in series with said portion thereof, and means responsive to the existence of combustion at the burner for operatively deenergizing said electric heating element and for effecting a change of circuit connections to said electromagnetic means to cause said electromagnetic means positively to maintain said switch in closed position but to render the same incapable of actuating said switch from open to closed position until a substantial time after cessation of combustion.

20. In a fuel burner control system, in combination, a source of electrical supply, electrically operated means for supplying fuel to the burner, a switch in circuit between said electrically operated means and said source, double-coil electromagnetic means for controlling the operation of said switch, a main control for effecting energization of one of the coils of said electromagnetic means to actuate said switch from open to closed position, thermo-electric means for stopping operation of said electrically operated means upon failure of combustion and comprising an electric heating element separate from said electromagnetic means and connected in series with said one of the coils thereof, and means responsive to the existence of combustion at the burner for operatively deenergizing said electric heating element and for effecting a change of circuit connections to the coils of said electromagnetic means to cause said electromagnetic means positively to maintain said switch in closed position but to render the same incapable of actuating said switch from open to closed position until a substantial time after cessation of combustion.

21. In a fuel burner control system, in combination, a source of electrical supply, electrically operated means for supplying fuel to the burner, a switch in circuit between said electrically operated means and said source, electromagnetic means for controlling the operation of said switch comprising a pull coil operative when energized to actuate said switch from open to closed position and a hold coil incapable of actuating said switch from open to closed position, but operative when energized to hold said switch in closed position, a main control for effecting energization of said pull coil, and means responsive to the existence of combustion at the burner for maintaining energization of said hold coil subsequent to the closing of said switch and for deenergizing said pull coil and maintaining the same deenergized for a substantial interval of time after cessation of combustion.

In witness whereof, I have hereunto subscribed my name.

JOHN C. BOGLE.